(No Model.)
F. W. GRAVES.
REGULATING DAMPER FOR CONTROLLING INCOMING CURRENTS OF AIR.
No. 571,658. Patented Nov. 17, 1896.
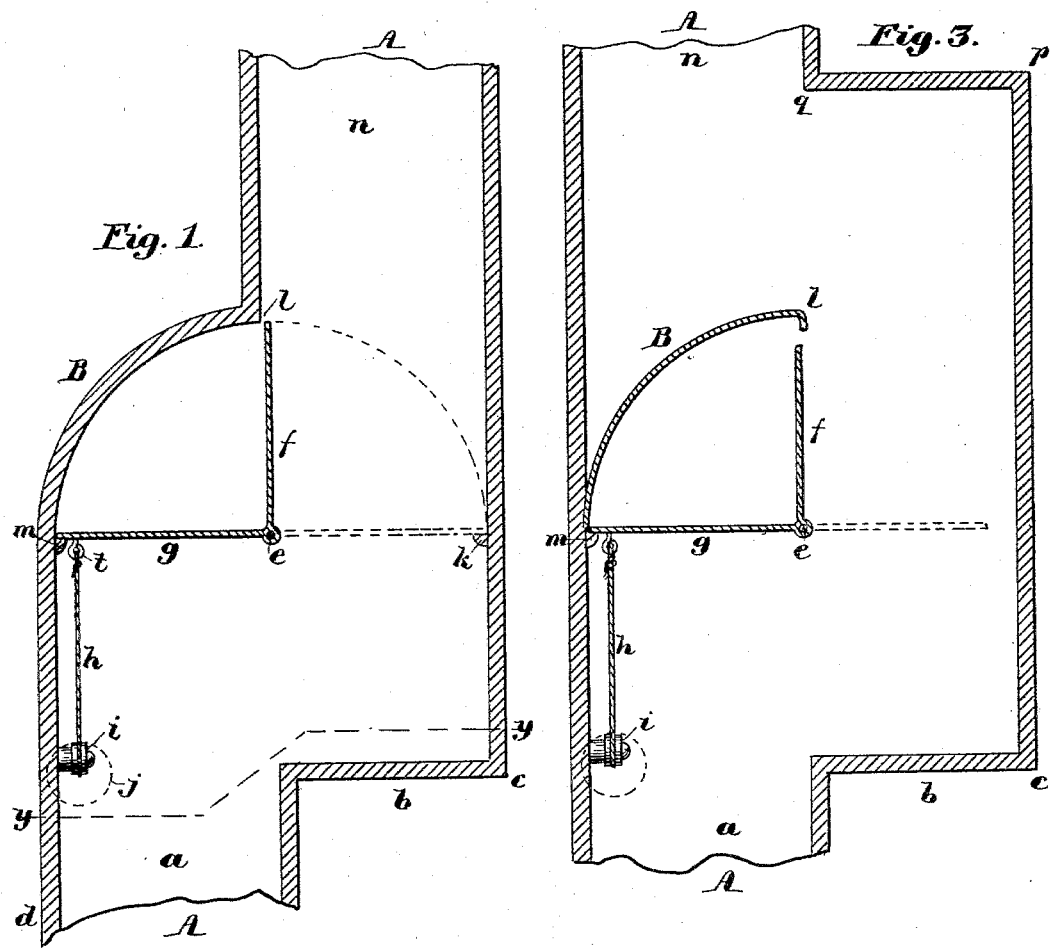
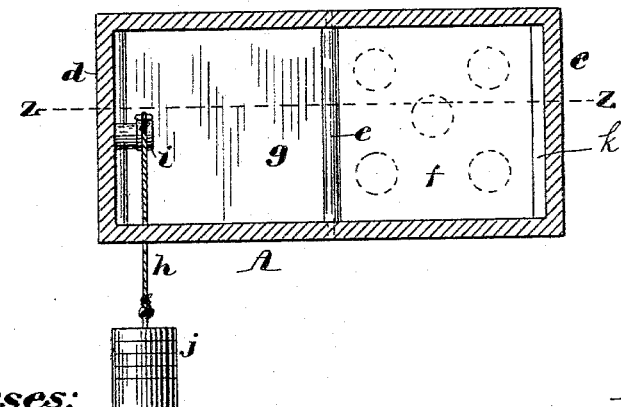

United States Patent Office.

FRANK W. GRAVES, OF WOBURN, MASSACHUSETTS.

REGULATING-DAMPER FOR CONTROLLING INCOMING CURRENTS OF AIR.

SPECIFICATION forming part of Letters Patent No. 571,658, dated November 17, 1896.

Application filed February 12, 1896. Serial No. 579,012. (No model.)

*To all whom it may concern:*

Be it known that I, FRANK W. GRAVES, of Woburn, in the county of Middlesex and State of Massachusetts, have invented a new and useful Improvement in Automatic Regulating-Dampers for Controlling Incoming Currents of Air, which will, in connection with the accompanying drawings, be hereinafter fully described, and specifically defined in the appended claims.

Figure 1 is a horizontal longitudinal section of an air-pipe or conduit with my improved damper mechanism applied, the section being taken on the line $zz$ of Fig. 2. Fig. 2 is a transverse vertical section on line $yy$, Fig. 1, the air-controlling wing of the damper being shown in its closed position by dotted lines, so as to show the air-aperture in said wing; and Fig. 3 is a view like Fig. 1, but showing a modification of the air-pipe or conduit and the valve.

The object of the invention is to automatically regulate the indraft of air through the pipe or conduit by the force of the air-current acting upon a damper against the action of its counterbalancing medium.

The invention primarily consists in an air-inlet pipe or conduit and an automatically-operating counterbalanced two-winged damper or valve pivoted at its angle therein, with its operating-wing facing the inlet end of said pipe or conduit to receive the impact of the air and swing the valve against the action of the counterbalance, the other or air-regulating wing of the damper or valve extending rearwardly or toward the outlet end of the pipe or conduit and adapted to be swung across the pipe by the first-named wing to control the passage of air therethrough.

The invention further consists in the construction and combinations of parts hereinafter described and claimed.

A A represent the air-pipe or conduit, which may be the cold-air conduit of a furnace. This pipe or conduit is formed with an offset, so that it has two longitudinal-extending sections $a$ $n$. The wall is of the same width as the conduit and extends to the point $c$, which marks the line of the outer wall of the pipe or conduit section $n$. The outer wall $d$ of the pipe or conduit section $a$ extends straight to the point $m$, which is beyond the wall $b$, a distance equal to the width of the pipe or conduit, and said wall $d$ is then curved, as at B, to the point $l$, which is in the line of the inner wall of the pipe or conduit section $n$. Within the chamber formed by this offset in the pipe or conduit I pivot at $e$ the two-winged damper or valve, the air-operated wing $g$ of which faces the pipe-section $a$ to receive the impact of the incoming air, while the air-regulating wing $f$ projects toward the pipe-section $n$ in line with the inner walls of pipe-sections $a$ $n$, as clearly shown in Figs. 1 and 3.

The axis $e$ of the damper or valve is in the center of the offset, and the wing $g$ is of a width to work close to the curved wall or abutment B, while the apertured wing $f$ is of a width to extend to the stop $k$ on the opposite wall and close the conduit to the passage of air except the small amount passing through said apertures or openings.

The wing $g$ contacts with a similar stop $m$ on the wall $d$. It will be seen, therefore, that the air-current will strike the wing $g$, be deflected to the right, and then pass onwardly through the pipe-section $n$, and in so doing will, according to its force or strength, move the wing $g$ along the abutment B and thereby cause the wing $f$ to cross the conduit toward the stop $k$, as shown by the dotted curved line in Fig. 1.

In order that the damper or valve may return to its normal position, a suitable counterbalance is provided, which must be overcome ere the air-current can swing the damper or valve, and which will always tend to move the damper or valve back to its normal position, which is that shown in full lines in Figs. 1 and 3. In the several figures this counterbalance is shown as consisting of an adjustable weight $j$ exterior to the conduit and suspended by a cord $h$, passing over a guide-pulley $i$ within the conduit and connected to an eye $t$ on the impact face of the wing $g$. By increasing or lessening the weight represented by $j$ the damper may be set or adjusted to operate at any desired air-pressure. Of course I do not restrict myself to any particular counterbalance.

Referring to Fig. 3 it will be seen that the air-pipe or conduit-sections $a$ $n$ are in longitudinal alinement and that the offset is formed in one side only thereof, while the abutment or curved wall B is on the interior of the conduit, with its free edge $l$ projecting toward the longitudinal wall of the offset. The offset extends transversely from $b$ to $c$, thence longitudinally to $p$, thence inwardly to $q$, the width of the offset portion being equal to the width of the conduit-pipe A, while its length from $c$ to $p$ is about three times the width of the pipe or conduit in order to allow the air to enter the section $n$ after passing wing $f$.

The damper or valve operates the same as in Figs. 1 and 2 and is similarly constructed, except that the wing $f$ instead of being apertured is made a little narrower than in Fig. 1, so that a small amount of air can always pass, even though said wing is at right angles to the conduit. I prefer the form of apparatus shown in Fig. 1, however, as the current of air is not so often deflected. In both forms of the apparatus, however, the volume of air will be automatically controlled in its passage to the fire or to the hot-air chamber of a furnace, or to any other point of delivery.

What I claim is—

1. The combination with a fluid-duct, provided with an enlarged portion, of a damper and a motor for said damper, both situated in said enlarged portion; the movable element of the motor being situated in and the damper being situated out of the initial path of the current.

2. The combination with an air-inlet pipe or conduit having an enlargement at one side, of an automatically-operating, counterbalanced, angular two-wing damper or valve, pivoted at its angle in said pipe or conduit with its operating-wing facing the inlet end thereof to receive the impact of the air and swing the valve against the action of its counterbalance; the air-regulating damper-wing extending toward the outlet end of the conduit and adapted to be swung across the said pipe or conduit and into said enlargement by the first-named wing to control the passage of the air therethrough, substantially as described.

3. The combination with an air-inlet pipe or conduit having a curved wall or abutment on its inner side, of a swinging, counterbalanced damper or valve mounted in the conduit and provided with two wings at right angles to each other; one wing moving close to the said abutment or curved wall to receive the impact of the incoming air and swing the damper or valve and cause the other wing to swing across the pipe or conduit and regulate the passage of air therethrough.

4. The combination with an air-pipe or conduit, offset between its ends, and there provided with a curved wall or abutment, of a two-winged counterbalanced damper or valve mounted in the pipe or conduit, with its operating-wing facing the inlet end thereof and working against said curved wall or abutment, and its air-regulating wing extending toward the outlet end of the pipe or conduit and adapted to swing across the offset and regulate the passage of air therethrough to the outlet end.

5. The combination with an air-inlet pipe or conduit, having a curved wall or abutment on its inner side, of a swinging, two-winged damper or valve, having a variable counterbalancing device and mounted in the pipe or conduit, with its operating-wing facing the inlet end thereof to receive the impact of the air and working close to said curved wall or abutment, and its air-regulating wing extending toward the outlet end and adapted to be swung across the pipe or conduit by the air-pressure exerted on the operating-wing.

6. The combination with the air-inlet pipe or conduit and a curved wall or abutment, of a two-winged damper or valve, mounted in the pipe at the offset, with its operating-wing facing the inlet end and working close to the said curved wall or abutment, and its air-regulating wing extending toward the outlet end to swing across the offset, a guide in front of the operating-wing and a weight having a cord extending over the guide to the front side of the said operating-wing.

FRANK W. GRAVES.

Witnesses:
T. W. PORTER,
J. D. THOMSON.